United States Patent [19]

Plante et al.

[11] Patent Number: 4,655,563

[45] Date of Patent: Apr. 7, 1987

[54] VARIABLE THICKNESS DEFORMABLE MIRROR

[75] Inventors: Roland L. Plante, Hudson, Mass.; Austin L. McKenney, Amherst, N.H.

[73] Assignee: Itek Corporation, Lexington, Mass.

[21] Appl. No.: 801,440

[22] Filed: Nov. 25, 1985

[51] Int. Cl.[4] .......................... G02B 7/18; G02B 5/08
[52] U.S. Cl. ..................................... 350/611; 350/607
[58] Field of Search ............... 350/607, 608, 609, 611, 350/631

[56] References Cited

U.S. PATENT DOCUMENTS

| | | | |
|---|---|---|---|
| 3,620,606 | 11/1971 | Tschunko | 350/611 |
| 3,904,274 | 9/1975 | Feinleib | 350/607 X |
| 3,923,400 | 12/1975 | Hardy | 350/572 X |
| 4,091,274 | 5/1978 | Wolcott et al. | 350/611 X |

*Primary Examiner*—Donald Watkins
*Attorney, Agent, or Firm*—Michael H. Wallach; Robert F. Rotella

[57] ABSTRACT

A lightweight deformable mirror suitable for space applications is disclosed in which a plurality of electrically-operated electrodistortive actuators may be used to selectively deform the mirror's reflecting surface. The actuators are sandwiched between a pair of thin sheets of glass with the surface of one sheet finished to form the mirror's reflecting surface. By selectively energizing one or more of the actuators, the mirror surface can be deformed to correct aberrations in optical wavefronts impinging on the mirror or to encode signals into wavefronts projected onto the mirror surface. Electrical connections to the actuators may be made through printed circuit connections which are contained on the bottom sheet of the deformable mirror. Since the bottom sheet is permitted to flex along with the top sheet containing the reflecting surface in response to forces imparted thereto when the actuators are energized, a lightweight, thin sheet of glass can be used for the bottom sheet, thereby reducing the mirror's overall weight. In one embodiment, three pairs of kinematic mounts support the deformable mirror and may be used to change the orientation of the mirror's reflecting surface. In an alternate preferred embodiment, gross changes in the shape of the mirror's reflecting surface may be made by operating control actuators which are fastened between the deformable mirror and the surface on which the mirror is mounted.

10 Claims, 4 Drawing Figures

VARIABLE THICKNESS DEFORMABLE MIRROR

BACKGROUND OF THE INVENTION

1. Field of the Invention

This invention is in the field of optical mirrors, and more particularly is related to a lightweight deformable mirror in which the reflecting surface may be deformed by a plurality of independently operable electrodistortive actuators to correct aberrated wavefronts reflected from the mirror's reflecting surface.

2. Description of the Prior Art

The correction of aberrated wavefronts by the use of deformable mirrors is known in the art. See, for example, U.S. Pat. No. 3,904,274 which issued on Sept. 9, 1975, which is owned by the assignee of the present invention and the teachings of which are incorporated herein by reference. It is known that aberrated optical wavefronts in which the aberration is caused for example by thermal gradients, atmospheric turbulence, dust, etc., may be corrected by selectively deforming the reflecting surface of a mirror so that the reflected wavefront has the aberration removed therefrom.

Prior-known deformable mirrors have relied on the use of one or more actuators to deform the reflecting surface to remove aberrations present in the incident wavefront. However, prior-known deformable mirrors, such as that shown in the aforementioned U.S. Pat. No. 3,904,274, are not easily fabricated in large sizes suitable for use in space-based telescopes and laser applications. Furthermore, their method of construction requires an excessive amount of relatively heavy material to provide support for the actuators used to deform the mirror surface, which is detrimental for a component suitable for use in a space-based system. Prior-known deformable mirrors such as those shown in the aforementioned '274 patent are also difficult to fabricate into shapes other than those having a planar reflecting surface.

SUMMARY OF THE INVENTION

Accordingly, it is therefore an object of this invention to provide a lightweight deformable mirror which can correct high-frequency wavefront aberrations.

It is a further object of this invention to provide a deformable mirror which does not require a heavy support structure.

Still another object of this invention is to provide a deformable mirror in which a large mirror surface is supported by a large number of closely-spaced actuators so that small localized incremental changes may be made to the shape of the mirror's entire reflecting surface.

Another object of this invention is to provide a deformable mirror in which the mirror's reflecting surface may be non-planar (e.g. concave) in shape.

Still another object is to provide a deformable mirror in which gross changes in the shape of the mirror's reflecting surface may be made with one set of actuators while another set of actuators is available to make fine changes to small incremental areas of the mirror's reflecting surface.

The above and other objects and advantages of this invention are achieved by providing a deformable mirror in which a plurality of electrodistortive actuators are sandwiched between two thin sheets of flexible material, such as glass. The actuators are manufactured from a material which elongates upon the application of an electrical signal thereto. The top sheet of the deformable mirror may be polished and/or coated to form a reflecting surface. The reflecting surface may be selectively deformed by the application of electrical signals to one or more of the actuators, which causes the actuators to which a signal has been applied to elongate in an amount proportional to the electrical signal applied to each of the actuators and thereby exert a force between the mirror's two sheets in the vicinity of each of the energized actuators. Since the electrodistortive actuators are sandwiched between the two sheets, both the top sheet and the bottom sheet will be distorted in the area of each of the energized actuators. The displacement of the sheet containing the reflecting surface relative to the bottom sheet may be controlled by selecting the stiffness of the top sheet relative to that of the bottom sheet by, for example, making one sheet thicker than the other or by fabricating one sheet from a material which has a greater stiffness than the other sheet.

In one disclosed embodiment, the deformable mirror is supported by three pairs of kinematic bi-pod mounts. Each mount includes a pair of adjustable support members whose length may be varied as, for example, by the use of an electrical motor, to permit the orientation of the mirror's reflecting surface to be changed. A second embodiment is also disclosed in which the deformable mirror is supported above a surface by a relatively small number of electrodistortive support actuators. Rough changes to the shape of the mirror's reflecting surface may be made by selectively operating one or more of the support actuators. Fine changes in the shape of the mirror's reflecting surface may be made by operation of the actuators sandwiched between the mirror's front and back sheets.

In a preferred embodiment, the bottom sheet includes electrical interconnections for connecting the actuators to electronic apparatus which may be used to selectively operate the actuators. The electrical interconnections may be in the form of printed circuits which are deposited onto the bottom sheet and which are connected to the electrodistortive actuators.

BRIEF DESCRIPTION OF THE DRAWINGS

The above objects and other advantages of the invention will become readily apparent upon examination of the detailed description of a preferred embodiment when read in conjunction with the accompanying drawings in which.

DETAILED DESCRIPTION OF PREFERRED EMBODIMENT

Figure 1:
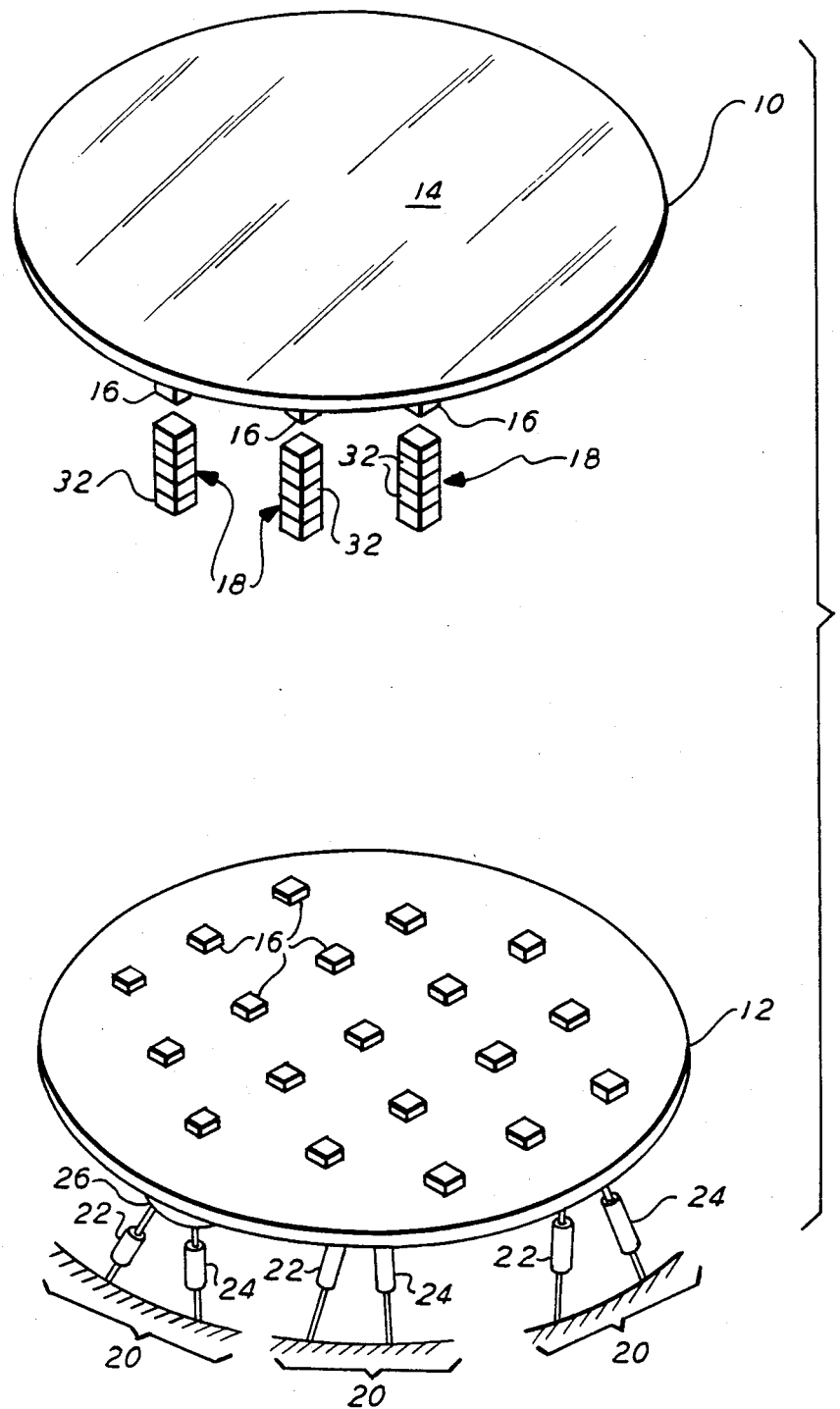
FIG. 1 is a disassembled perspective view of a first embodiment of a deformable mirror constructed in accordance with the teachings of this invention.

Referring to the drawings, FIG. 1 shows a perspective view of the disassembled components of a first embodiment of a variable thickness deformable mirror constructed in accordance with the teachings of this invention. The mirror includes a top sheet 10 and a lower sheet 12. Sheet 10 preferably includes an upper surface 14 having a reflective surface thereon which may be used to reflect visible optical radiation from other well-known optical instruments as, for example, optical images from telescopes or radiation from a laser. For purposes of illustration, the surface 14 is shown as a planar surface. However, it is to be understood that the invention disclosed herein can easily be adapted to other surface geometries, for example convex or concave surfaces. Preferably the top sheet 10 and the bottom sheet 12 are each made from thin glass plates which can flex when subject to a force normal to the plane of the surface thereof. While the preferred embodiment discloses the use of glass for the top sheet 10 and bottom sheet 12, other materials including metals such as beryllium or molybdenum or composites such as carbon-carbon or glass-carbon could also be used to fabricate sheets 10 and 12 without departing from the spirit of the invention. The top sheet 10 and bottom sheet 12 may each include a plurality of buttons 16 which may be either integrally formed in each sheet 10 and 12 or fastened thereto, as for example by brazing or by the use of epoxy. The buttons 16 are used to support electrically operated electrodistortive actuators 18 which may be selectively operated by applying an electrical signal thereto to elongate each actuator in a manner well known in the art to thereby distort the mirror surface 14 in the vicinity of each actuator to which an electrical signal has been applied. Preferably, the buttons 16 are located across the top surface of the sheet 12 and the lower surface of the sheet 10 so that when the sheet 10 overlies the sheet 12 after the deformable mirror has been assembled, each of the buttons 16 on the top surface of sheet 12 has a corresponding button 16 on the lower surface of sheet 10 aligned directly thereover. The number and location of buttons 16 on the top sheet 10 and bottom sheet 12 are chosen to correspond to the number of actuators 18 required to control the surface distortions desired to be imparted to the mirror surface 14. It will be appreciated by one skilled in the art that actuators 18 when spaced closely to each other will permit more precise control of the deformation of small incremental areas of the mirror's reflecting surface than fewer actuators 18 spaced farther apart from each other. The number and spacing of the actuators 18 used to control deformation of the mirror surface is chosen on the basis of the type and severity of aberrations to be removed from or added to the optical wavefronts impinging on the mirror's reflecting surface.

Preferably the deformable mirror is supported by three pairs of kinematic bi-pod mounts, one preferred construction of which is shown generally in FIG. 1 at 20. The mounts permit the orientation of the mirror surface 14 to be changed to enable the mirror surface to be oriented relative to the incoming wavefront to be reflected therefrom. Each mount 20 includes a pair of variable length actuators 22 and 24, each of which are pinned at one end to the supporting structure (not shown) on which the deformable mirror is mounted. The opposite ends of each of the actuators 22, 24 are fastened through a joint 26 to the lower surface of the bottom sheet 12. The angle and distance between each pair of actuators 22, 24 for each kinematic mount is chosen so that the reaction forces generated by the kinematic mounts in supporting the mirror act through the neutral axis of the mirror. Preferably, the actuators 22 and 24 are electromechanical or hydraulic actuators whose length may be varied by the application of an electrical or fluidic signal thereto. The six independently controllable actuators which form the three pairs of kinematic mounts permit the six degrees of freedom necessary to control all six of the possible rigid body motions of the deformable mirror. To achieve the six degrees of freedom, the end of each actuator 22, 24 in the three pairs of kinematic mounts 20 is attached to the bottom surface of the mirror through the joint 26. The other end is attached to the supporting structure. The angle between pairs of actuators is selected such that the lines of action of the actuators 22, 24 in a pair intersect at the neutral axis of the mirror. Further, the angle is selected to optimally withstand anticipated forces and moments arising from changes in orientation of the mirror in a gravity field as well as from rigid body motions of the mirror such as may be encountered in a telescope mount.

Figure 4:
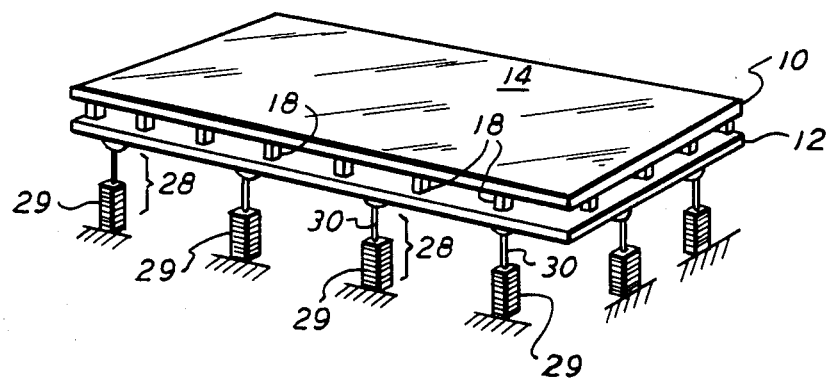
FIG. 4 is a perspective view of a second embodiment of a deformable mirror embodying the teachings of the invention.

FIG. 4 shows an alternate embodiment of the variable thickness deformable mirror disclosed herein in which the mounts 20 are replaced with long-stroke (greater than 100-micrometer) actuators 28. The actuators 28 each include a control member 29 which may be a stepper motor, an electrodistortive actuator (such as that shown in U.S. Pat. No. 4,533,219 the teachings of which are incorporated herein by reference) or other device suitable for changing the distance between a control rod 30 fastened between the control member 29 and the lower sheet 12 and the support on which the mirror is mounted. Preferably a signal, such as an electrical signal, can be applied to each control member 29 to vary the distance between the mirror and the mirror support. By selectively varying the distance between the mirror and the surface on which it is mounted, gross changes can be made to the shape of the mirror surface 14. Thereafter, finer changes may be made to the shape of the surface 14 by selective actuation of one or more of the actuators 18.

Figure 3:
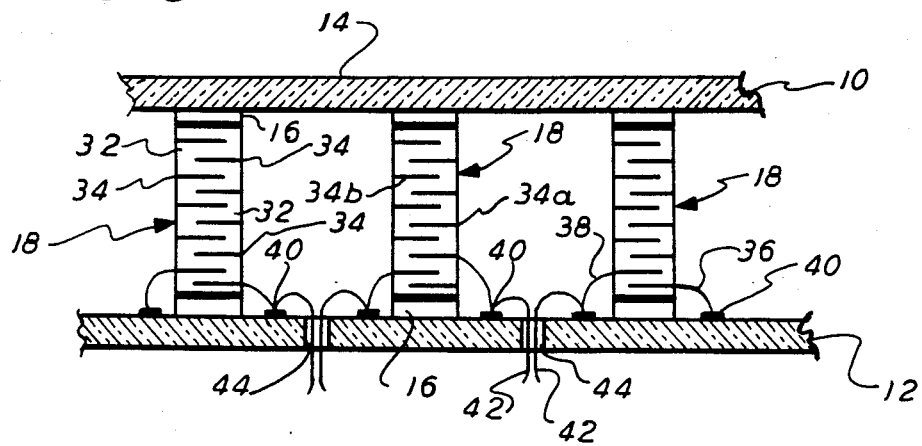
FIG. 3 is a side view of a portion of the deformable mirror of FIG. 1 showing in detail the electrodistortive actuators.

FIG. 3 best illustrates how the electrodistortive actuators 18 used in either of above-described embodiments are fastened between the top sheet 10 and the bottom sheet 12. Preferably, each actuator 18 is fastened at its top and bottom to the buttons 16 using any conventional fastening technique, as for example by the use of an epoxy cement. The electrodistortive actuators 18 are constructed from any material which exhibits elongation when an electrical signal is applied thereto, as for example lead magnesium niobate (PMN), lead zirconium titanate (PZT) or lead lanthinan zirconium titanate (PLZT). In the embodiment shown herein, the electrodistortive material is stacked in layers 32 between which are interleaved layers of electrodes 34. The electrodistortive material 32 elongates in a manner well known in the art when an electrical potential is applied across it, for example when an electrical signal is applied between the electrodes 34a and 34b. Alternating layers of electrodes 34 in each actuator 18 are connected to each other, as for example by commonly connecting the alternating layers along opposite edges of the actuators 18. The alternating layers of electrodes 34 are each respectively connected to sources of electrical signals, for example through connections 36 and 38. Connections 36 and 38 may be fastened to a wiring pattern 40 which is screened or otherwise deposited on a surface of bottom sheet 12. Electrical connections may be made to the wiring pattern 40 on the bottom sheet by the use of a conventional, well-known edge connector (not shown) which is fastened to one edge of the bottom sheet 12 or by wire leads 42 which may pass through holes 44 in the bottom plate 12 to permit connection of the actuators 18 to electronic apparatus (now shown) for driving the actuators 18.

Figure 2:
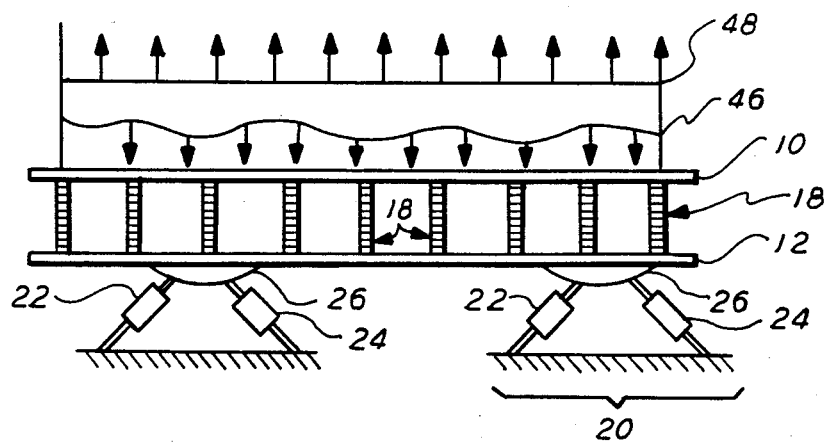
FIG. 2 is a side view of the deformable mirror of FIG. 1.

As may best be seen from FIG. 2, an aberrated optical wavefront 46 may be corrected by selectively operating various of the actuators 18 to distort the mirror surface 14 of the top sheet 12 so that the reflected wavefront 48 has the aberrations removed therefrom. The deformable mirror described herein may be used in conjunction with the system disclosed in U.S. Pat. No. 3,923,400, the teachings of which are incorporated herein by reference, to produce the wavefront correction shown in FIG. 2. It will be appreciated that by properly choosing the voltage applied to each of the actuators 18, the specific amount of elongation of each actuator and, hence, the amount of distortion imparted to the top sheet 10 can be accurrately controlled. Since the actuators 18 to which electrical signals have been applied impart a force between the top sheet 10 and the bottom sheet 12, the bottom sheet 12 will also be distorted. However, since the kinematic mounts 20 are arranged to support the mirror along the mirror's neutral axis, the displacements imparted to the top sheet 10 by the actuators 18 will not be damped by the mounts 20.

Since the bottom sheet 12 does not have to be stiff enough to absorb the elongation forces of the actuators 18 without itself distorting, the bottom sheet 12 can be made of a thin sheet of material, thereby reducing the total weight of the deformable mirror and making a mirror constructed in accordance with this invention suitable for space applications. If the bottom sheet 12 is constructed of material having the same bending stiffness as the top sheet 10, the top sheet 10 will be displaced one-half of the total incremental increase in length of the actuator 18 after the actuator is energized. For conditions where greater displacement of the reflective surface 14 of the top sheet 10 relative to the bottom sheet 12 is required, the bending stiffness of the bottom sheet 12 may be made greater than that of the top sheet 10 by either increasing the thickness of bottom sheet 12 or by manufacturing it from a material having a higher bending stiffness than the material from which the top sheet is constructed.

While a deformable mirror having a flat, planar top sheet has been shown and described in the preferred embodiments, it is to be understood that other configurations may be constructed within the teachings of the disclosed invention. For example, both the top sheet and the bottom sheet could be concave or convex or the top sheet containing the reflecting surface could be concave or convex and the bottom sheet could be flat. Moreover, any of the foregoing configurations, including those described in the preferred embodiments, could be constructed with a central aperture passing through both the reflecting surface and the bottom sheet to permit light to be focused from the mirror surface 14 onto a mirror placed at the primary focus of the mirror surface 14, and then back through the deformable mirror via the aperture to other electronic or optical apparatus contained behind the deformable mirror.

While two preferred embodiments of the present invention has been described in detail herein, it is to be understood that variations such as those described above are intended to be covered within the spirit of the invention and that the invention be limited only by the permissible scope of the following claims:

We claim:

1. A variable-thickness deformable mirror for correcting aberrations in optical wavefronts comprised of:
   a. a flexible top sheet having a reflecting surface on one side thereof;
   b. a flexible bottom sheet spaced away from said top sheet;
   c. a plurality of electrodistortive actuators located between said top sheet and said bottom sheet, each of said actuators being fastened to said top sheet and to said bottom sheet and being capable of selectively distorting the reflecting surface of said top sheet upon the application of electrical signals to one or more of said actuators;

whereby aberrated optical wavefronts impinging on the reflecting surface of said deformable mirror may have said aberrations removed by the selective deformation of the reflecting surface of said top sheet.

2. The variable thickness mirror of claim 1 wherein said top sheet and said bottom sheet are manufactured from glass.

3. The variable thickness mirror of claim 1 wherein said top sheet and said bottom sheet each contain raised buttons for receiving said actuators, said buttons being located at locations corresponding to the locations at which said actuators are to be fastened to said top and bottom sheets.

4. A variable thickness deformable mirror for correcting aberrations in optical wavefronts comprising:
   a. a top flexible sheet of glass having a first, upper surface containing a reflecting surface and a second, lower surface containing raised buttons distributed across the surface thereof;
   b. a lower, flexible sheet of glass located below and spaced away from said top sheet, said lower sheet having a first surface facing said second, lower surface of said top sheet, said first surface of said lower sheet also containing raised buttons with the number and location of said raised buttons on the first surface of said lower sheet equal to and spaced directly below the number of raised buttons contained on the second, lower surface of said first sheet;
   c. a plurality of actuators for applying a mechanical force between said top sheet and said lower sheet in response to signals applied to said actuators, each of said actuators contacting and spanning the space between a respective one of said buttons on said lower surface of said top sheet and the corresponding button on the first surface of said second sheet with said first sheet being supported above said second sheet by said actuators;

whereby the reflecting surface on said first sheet may be selectively deformed by applying signals to selective ones of said actuators.

5. The variable thickness mirror of claim 1 further including a plurality of actuators fastened between said bottom sheet and a supporting surface to support said mirror away from said supporting surface, said actuators being capable of applying mechanical forces to said deformable mirror to bend said deformable mirror in response to control signals applied to said actuators, whereby changes in the shape of said deformable mirror may be made by the selective application of signals to selected ones of said actuators supporting said mirror.

6. The variable thickness mirror of claim 1 further including three pairs of mounts fastened between said variable thickness mirror and a rigid surface for mounting said variable thickness mirror to said rigid surface, each of said mounts having control members for imparting a mechanical force to said variable thickness mirror to change the orientation of said variable thickness mirror's reflecting surface.

7. The variable thickness mirror of claim 6 wherein each of said control members includes an electrical stepper motor which may be selectively operated to vary the length of a rigid member fastened between said control member and said variable thickness mirror.

8. The variable thickness mirror of claim 1 wherein the bending stiffness of said top sheet is approximately the same as the bending stiffness of said bottom sheet.

9. The variable thickness mirror of claim 1 wherein said top sheet has a concave reflecting surface thereon before any of said electrodistortive actuators are elongated by the application of electrical signals thereto.

10. The variable thickness mirror of claim 1 wherein said top sheet has a first, concave outer reflecting surface and a second, convex rear surface and said bottom sheet has a first concave outer surface and a second, convex rear surface and said actuators are fastened between the second, convex surface of said top sheet and the second, convex rear surface of said bottom sheet.

* * * * *